June 7, 1966  R. NEUSCHOTZ  3,254,690
METHODS AND APPARATUS FOR LOCKING THREADED
ELEMENTS AND THE PRODUCT PRODUCED THEREBY
Filed Oct. 8, 1964  2 Sheets-Sheet 2

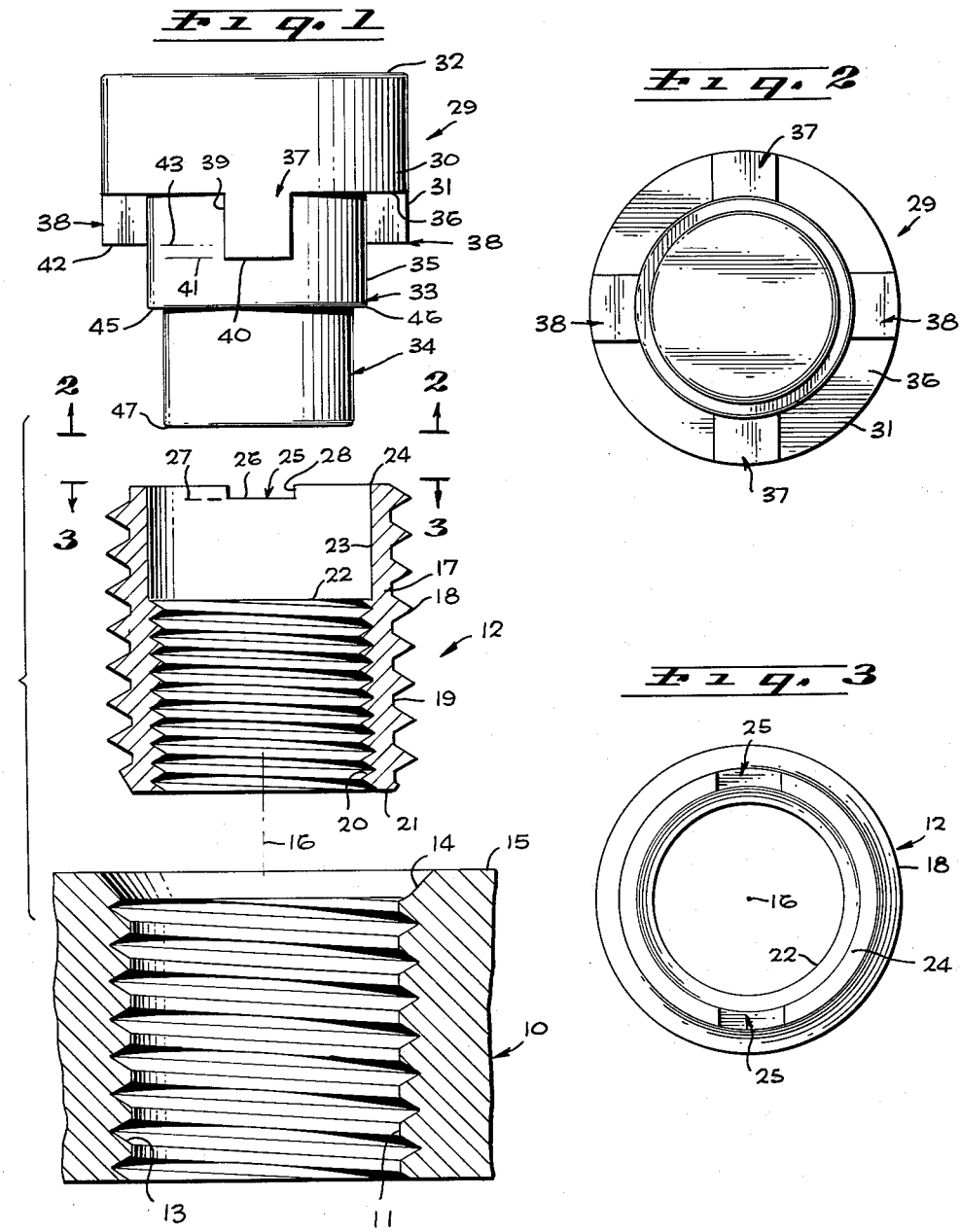

ROBERT NEUSCHOTZ
INVENTOR.

BY William P. Green
ATTORNEY

United States Patent Office 3,254,690
Patented June 7, 1966

3,254,690
METHODS AND APPARATUS FOR LOCKING THREADED ELEMENTS AND THE PRODUCT PRODUCED THEREBY
Robert Neuschotz, 1162 Angelo Drive, Beverly Hills, Calif.
Filed Oct. 8, 1964, Ser. No. 402,406
17 Claims. (Cl. 151—22)

This invention relates to improved methods and apparatus for installing a threaded element, such as an internally and externally threaded insert, within a carrier part, and to the product produced by said methods and apparatus. The invention is concerned particularly with the locking of such a threaded element against unscrewing rotation relative to the carrier part. The invention constitutes, in certain respects, an improvement on the invention disclosed and claimed in copending application Serial Number 405,647, filed October 8, 1964, on "Locking of Threaded Parts Against Removal," inventors Robert Neuschotz and Cullen E. James.

In the above identified application, there has been disclosed a method for installing an externally threaded element, by first screwing the element into a carrier part, and then locally driving a portion of one or more turns of the element axially relative to another portion of the same turn or turns of the thread, in a manner forming an effective interlock preventing rotation of the installed element. A major object of the present invention is to provide a method and apparatus which increase the facility with which an element may thus be sequentially screwed into place and then driven axially, with these two operations preferably being attained by two different movements of a single tool, so that this tool may, without additional installing mechanism, perform the complete installing and locking operation. At the same time, the invention avoids unnecessary complication in the structure of the insert or other threaded element, or in the structure or manner of handling of the installing tool.

To facilitate initial threaded advancement of the element into the carrier part, the element may be provided with a rotary drive recess at its axially outer end, and the tool may be provided with a coacting rotary drive projection, which extends into the recess, and rotatively turns the element as the tool is turned. After the insert has reached its fully installed position, the tool is driven axially, by a hammer, press, or other driving structure, and upon such axial driving movement a projection or projections on the tool locally deform the threaded element, and drive certain portions of its threads axially in a manner attaining the discussed locking action. Preferably, the same projection initially utilized for rotary driving of the insert is also employed for axially deforming or distorting the adjacent thread portion in forming the ultimate interlock for preventing unscrewing of the insert. Also, an additional projection or plurality of projections, may also be provided on the tool, for engaging an axially outer surface of the threaded element during its initial installation, and for forming additional recesses in the end of the insert when the tool is ultimately driven axially. The rotary drive projection (or projections) act to deepen their mating recesses in the threaded element, while others of the projections act to form recesses at areas which may initially be unrecessed. To attain this operation, the rotary drive projections extend axially farther than the circularly offset other projections which engage initially unrecessed areas.

The above and other features and objects of the invention will be better understood from the following detailed description of the typical embodiment illustrated in the accompanying drawing, in which:

FIG. 1 is a partially sectional side view illustrating an insert which is to be screwed into a carrier part, and showing also the tool to be utilized for installing this insert;

FIGS. 2 and 3 are views taken on lines 2—2 and 3—3 respectively of FIG. 1;

Figure 4:
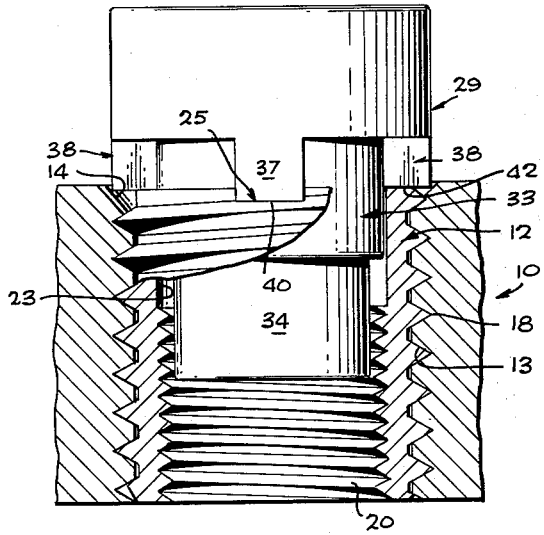
FIG. 4 shows the insert of FIG. 1 after it has been screwed into position, but before the axial driving action which locks the insert in place.

With reference first to FIG. 1, I have shown at 10 a carrier part containing a passage 11 into which an insert 12 is to be screwed. Passage 11 contains internal threads 13 having a tapering countersink 14 formed at their axially outer end, adjacent a typically planar outer surface 15 of the carrier part which is disposed transversely of a main axis 16 of the passage. The insert 12 has an essentially tubular body 17, carrying an external thread 18 dimensioned in correspondence with and adapted to threadedly engage internal thread 13 of the carrier part. The external thread 18 of the insert has modified minor diameter surfaces 19 extending substantially directly axially at locations axially between successive turns of thread 18.

Internally, insert 12 has an internal thread 20 for receiving and holding a coacting screw or stud after installation of the insert. This thread 20 extends continuously from the axially inner end 21 of the insert to a location 22, beyond which the insert contains a desirably straight cylindrical counterbore 23 centered about the same axis 16 as are the internal and external threads of the insert. At its axially outer end, the body of insert 12 has a surface 24 which is disposed transversely of axis 16, and extends annularly about that axis, continuously except at the location of two identical diametrically opposed recesses or notches 25. These notches 25 may have the shallow substantially rectangular configuration illustrated in FIG. 1, being defined by axially inner surfaces 26 lying in a transverse plane 27 which is parallel to the plane of surface 24, and with each of the notches or recesses 25 having also two circularly offset substantially parallel axially extending opposite side wall surfaces 28.

A preferred tool for installing the insert 12 is illustrated at 29 in FIG. 1, and includes a body 30 having a main enlarged diameter portion defined typically by an outer cylindrical surface 31 of a diameter corresponding approximately to the major diameter of external thread 18 of the insert. At its outer end, body 30 may have a transverse surface 32, adapted to be engaged by a hammer, press, or other driving equipment capable of exerting axially inward (downward) force against the tool.

At its under or axially inner side, body 30 of the tool integrally or rigidly carries a support section 33 and a pilot section 34. Section 33 is defined externally by an outer cylindrical surface 35 of a diameter corresponding substantially to the diameter of internal surface 23 of the inert, and therefore substantially smaller than the diameter of outer surface 31 of tool 29 (but centered about the same axis 16 as is that surface). Extending between surface 31 and surface 35, the tool body 30 forms an essentially annular shoulder surface 36, which is disposed transversely of axis 16, and is circularly continuous except at the location of two diametrically opposed identical rotary drive projections 37, and two circularly intermediate diametrically opposed second projections 38, which may be offset 90 degrees from projections 37 as will be apparent from FIG. 2. Each of the projections 37 and 38 extends the entire radial distance between the diameters of surfaces 31 and 35, and has a radially outer surface which may be curved in correspondence with an aligned with, and form in effect a continuation of, outer surface 31 of body 30. The circular extent of each lug 37 and 38 may be defined by two parallel opposite side surfaces 39, spaced in correspondence with surfaces 28 of the insert recesses 25, and extending substantially axially as shown, so that the extremities of projections 37 may be received and closely confined within recesses or notches 28 as seen in FIG. 4. At their axially inner sides (undersides as seen in FIG. 1), projections 37 have bottom or inner surfaces 40, which lie in a common plane 41 disposed transversely of axis 16, while projections 38 have similar undersurfaces 42 lying in a second plane 43 also disposed transversely of axis 16, and parallel to plane 41. As will be apparent from FIG. 4, the axial spacing between planes 41 and 43 of the tool is desirably the same as the axial spacing between plane 27 and the end surface of plane 24 of the insert.

Figure 5:
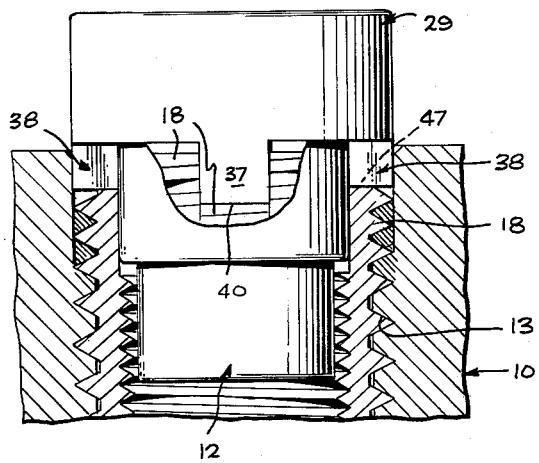
FIG. 5 is a view similar to FIG. 4, but showing the insert after the axial driving operation.

The axial extent of cylindrical surface 35 of the tool, from shoulder 36 to the location 45 of FIG. 1, may correspond approximately to, and be not greater than, the axial extent of counterbore surface 23 in the insert, so that in the ultimate condition of FIG. 5 the entire portion 33 of the tool may be received within the counterbore. Preferably, the portion 33 is annularly rounded at its lower end, as seen at 46 in FIG. 1.

The pilot portion 34 of the tool is externally cylindrical, and centered about axis 16, but of a diameter smaller than portion 33, and corresponding approximately to the minor diameter of internal thread 20 of the insert. This pilot 34 may also be annularly rounded at its lower end, as indicated at 47.

To now describe the process by which the insert 12 is installed, the first step is to place insert 12 about the portions 33 and 34 of tool 29, and to a position in which projections 37 of the tool extend into notches 25 of the insert, with projections 38 engaging the unrecessed arcuate or essentially annular surface areas 24 circularly between notches 25. This relationship of the tool and insert is illustrated in FIG. 4. With the tool and insert interfitting in this manner, the tool may be turned about axis 16 to screw the insert into carrier part 10, to the position of FIG. 4. During such rotation, the projections 37 of the tool positively turn the insert by virtue of their reception within rotary drive notches 25. The extent to which the insert is screwed into the carrier part is determined by ultimate engagement of projections 37 with countersink surface 14 of carrier part 10, when the tool and insert reach the position of FIG. 4. Thus, the tool acts to automatically set the insert to a proper position in the carrier part, substantially flush with its outer surface 15, or more preferably spaced slightly inwardly with respect to surface 15, to a condition which may be predetermined by the conformation given to the countersink surface 14.

Figure 6:
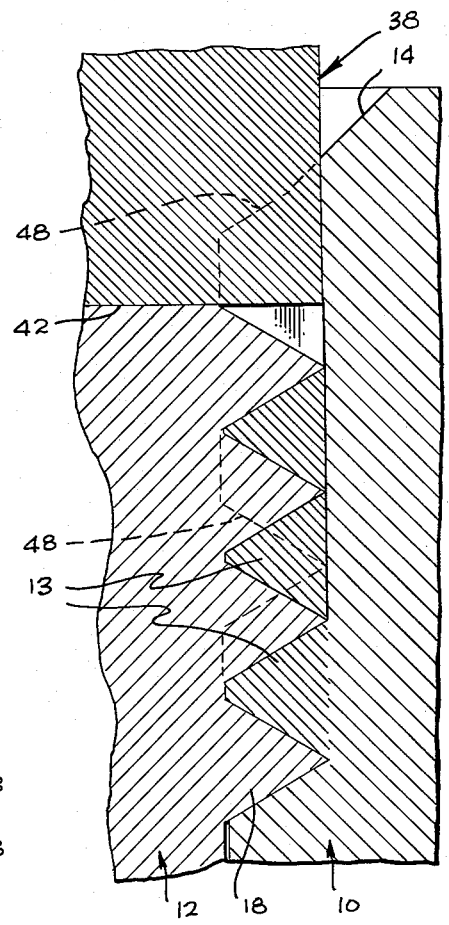
FIG. 6 is a greatly enlarged fragmentary axial (diagrammatic) section through the distorted threads of FIG. 5 at the location of one of the projections 38.

When the insert and tool have reached the FIG. 4 setting, the rotation of the tool is halted, and the operator then utilizes a hammer or other driving mechanism to drive body 30 of the tool axially downwardly relative to the insert and carrier part, to deform the insert to the condition illustrated in FIGS. 5 and 6. The tool is driven downwardly until shoulder surface 36 engages end surface 24 of the insert, and in thus moving downwardly, projections 37 act to deepen notches 25, while projections 38 act to form additional notches or recesses 47 in the initially unrecessed portion of the insert. These recesses 47 are of course more shallow than the deepened recesses 25. As each of the projections 37 and 38 moves downwardly into the material of the insert, it forces a localized portion of the insert side wall, directly beneath the projection, to move downwardly, through the entire radial thickness of that localized area; and correspondingly displaces a localized portion or segment of the external thread 18 of the insert downwardly relative to the portions of the thread which are circularly between projections 37 and 38. FIG. 6 diagrammatically illustrates the manner in which localized portions of the threads, immediately beneath the projections, are thus displaced downwardly to the full line positions of that figure, from the initial positions of the threads represented in broken lines at 48. Preferably, a plurality of turns of the thread are distorted in this manner, desirably all of those turns which are radially opposite counterbore surface 23 of the insert, with the upper turn of course being displaced more than the next lower turn, etc. The extent of axial displacement of the upper turn which is shifted by each projection may correspond approximately to between about one-half and one and one-half times the axial lead between successive turns of the external thread (desirably being approximately equal to said lead). It will of course be apparent that the axial displacement of the localized portions or segments of the external thread of the insert is also accompanied by corresponding axial displacement of localized portions of the internal thread of the carrier part, relative to other portions of the same turns of the carrier part, with at least some of the displaced segments of the insert thread being received circularly between two spaced portions of the internal thread of the carrier part, and vice versa, to allow the desired locking action. In this way an extremely effective locking action is attained between the insert and carrier part, at the locations of all of the projections 37 and 38 of the tool, and the entire insert has been completely installed and locked in place by a single tool.

I claim:

1. The method of installing within a carrier part an element having an external thread and having at least one axially outwardly facing rotary drive recess; said method including engaging with said element a tool having a drive projection extending into said recess in rotary driving relation, turning the tool and thereby turning said element and screwing it into the carrier part by engagement of the drive projection with the element within said recess, then displacing said tool and said drive projection thereof axially relative to the element and carrier part, and thereby deepening said recess by said projection and locally displacing axially a predetermined portion of a turn of said external thread relative to a circularly offset portion of the same turn to lock the element against unscrewing rotation.

2. The method of installing within a carrier part an insert having a tubular side wall with an internal thread and an external thread and having at least one axially outwardly facing rotary drive recess formed in an end portion of said side wall; said method including engaging with said insert a tool having a drive projection extending into said recess in rotary driving relation, turning the tool and thereby turning said insert and screwing it into the carrier part by engagement of the drive projection with the insert within said recess, then displacing said tool and said drive projection thereof axially relative to the insert and carrier part, and thereby deepening said recess by said projection and locally displacing axially a predetermined portion of a turn of said external thread relative to a circularly offset portion of the same turn to lock the insert against unscrewing rotation.

3. The method of installing within an internally threaded carrier part an element having an external thread and having at least one axially outwardly facing rotary drive recess; said method including engaging with said element a tool having a drive projection extending into said recess in rotary driving relation, turning the tool and thereby turning said element and screwing it into the internal thread of the carrier part by engagement of the drive projection with the element within said recess, then displacing said tool and said drive projection thereof axially relative to the element and carrier part, and thereby deepening said recess by said projection and locally displacing axially predetermined portions of engaging turns of said external thread and the carrier part thread relative to circularly offset portions of the same turns to lock the element against unscrewing rotation.

4. The method of installing within a carrier part an element having an external thread and having at least one axially outwardly facing rotary drive recess; said method including engaging with said element a tool having a drive projection extending into said recess in rotary driving relation and having an axially shorter second projection engaging a non-recessed end surface area of the element at a location offset circularly from said recess, turning the tool and thereby turning said element and screwing it into the carrier part by engagement of the drive projection with the element within said recess, then displacing said tool and said drive projection and second projection thereof axially relative to the element and carrier part, and thereby deepening said recess by said drive projection and forming a second recess by said second projection to locally displace axially portions of at least one turn of said external thread relative to circularly intermediate portions of the same turns to lock the element against unscrewing rotation.

5. The method of installing within a carrier part an element having an external thread and having at least one axially outwardly facing rotary drive recess; said method including engaging with said element a tool having a drive projection extending into said recess in rotary driving relation and having a second projection engaging the element at a location offset circularly from said recess, turning the tool and thereby turning said element and screwing it into the carrier part by engagement of said drive projection with the element within said recess, then displacing said tool and said second projection thereof axially relative to the element and carrier part, and thereby locally recessing said element at said location axially inwardly by said second projection and locally displacing axially a predetermined portion of a turn of said external thread relative to a circularly offset portion of the same turn to lock the element against unscrewing rotation.

6. A tool for installing within a carrier part an element having an external thread and containing a rotary drive recess, said tool including a rotatable and axially movable tool body adapted to turn said element and thereby screw it into said carrier part and adapted to then be driven axially relative to said element, a rotary drive projection on said body receivable within said recess to transmit rotary motion from said body to the element, and a second projection on said body projecting axially toward said element engageable axially against said element at a location offset circularly from said rotary drive projection, said rotary drive projection extending axially toward said element farther than said second projection, at least one of said projections being positioned adjacent said external thread at a location to locally displace a portion of said thread axially relative to another portion of the same turn upon said axial driving of the tool body.

7. A tool for installing within a carrier part an insert having a tubular side wall with an external thread and an internal thread and containing a rotary drive recess extending axially inwardly into an axially outer end of said side wall, said tool including a rotatable and axially movable tool body adapted to turn said insert and thereby screw it into said carrier part and adapted to then be driven axially relative to said insert, a rotary drive projection on said body extending axially toward said element and positioned for reception in said recess in said side wall to transmit rotary motion from said body to the insert, and a second projection on said body projecting axially toward said insert engageable axially against said tubular side wall of the insert at a location offset circularly from said rotary drive projection, said rotary drive projection extending axially toward said insert farther than said second projection, at least one of said projections being positioned adjacent said external thread at a location to locally displace a portion of said thread axially relative to another portion of the same turn upon said axial driving of the tool body.

8. A tool as recited in claim 7, in which said tool has a central supporting portion radially inwardly of said two projections projecting axially inwardly and presenting an outer surface engageable with the interior of said tubular insert to support it against inward collapse upon said axial displacement of the tool body.

9. A tool as recited in claim 8, in which said projections substantially meet and extend radially outwardly from said outer surface of the supporting portion at circularly spaced locations.

10. A tool as recited in claim 8, in which said tool has a pilot portion projecting axially inwardly beyond and from and smaller in transverse dimension than said supportnig portion.

11. A tool for installing within a carrier part an insert having a tubular side wall with an external thread, an internal thread, a counterbore axially outwardly of said internal thread, and an axially outer end surface containing a rotary drive recess; said tool including a rotatable and axially movable body having an essentially transverse and essentially annular shoulder positioned to be received axially opposite and face said end surface of the insert, an internal support extending axially inwardly beyond said shoulder and having an external support surface of circular cross section to engage said counterbore and support it against inward collapse, a rotary drive projection extending axially inwardly from said shoulder at a location radially outwardly of and closely adjacent said support surface and positioned for rotary driving reception within said drive recess in the insert to screw the insert into a carrier part, a second projection extending axially inwardly from said shoulder at a location radially outwardly of and closely adjacent said support surface and circularly offset from said drive projection and positioned to engage said end surface of the insert, said drive projection extending farther axially inwardly than said second projection.

12. A tool as recited in claim 11, in which said body has an externally essentially cylindrical pilot portion axially inwardly beyond and smaller in diameter than said support surfaces of said internal support for reception in said internal thread of the insert.

13. A tool as recited in claim 12, in which said body has two of said drive projections at opposite sides of the body and two of said second projections circularly therebetween.

14. The combination comprising a carrier part and an element having an external thread screwed into said part, said element having two circularly spaced recesses extending axially thereinto and having localized portions of a predetermined turn of said thread driven axially at said recesses relative to other offset spaced portions of the same turn to lock the element in said part, one of said recesses extending into the material of said element farther axially than does the other recess.

15. The method of installing within a carrier part an element having an external thread and having at least one axially outwardly facing rotary drive recess; said method including engaging with said element a tool having a drive projection extending into said recess in rotary driving relation, and having a portion engaging the element at a location offset circularly from said recess, turning the tool and thereby turning said element and screwing it into the carrier part by engagement of said drive projection with the element within said recess, then displacing said tool and said portion thereof axially relative to the element and carrier part, and thereby locally displacing said element at said location axially inwardly by said portion of the tool and locally displacing axially a predetermined portion of a turn of said external thread relative to a circularly offset portion of the same turn to lock the element against unscrewing rotation.

16. The method of installing within a carrier part an element having an external thread centered about an axis; said method including engaging with said element a tool having a rotary drive portion interfitting in rotary driving relation with said element and including a drive lug projecting axially into an axially facing recess in said element at a location offset from said axis, turning the tool and thereby turning said element about said axis and screwing it into the carrier part by said rotary drive portion of the tool, then displacing said tool axially relative to the element and carrier part, and thereby locally driving axially by said tool a predetermined portion of said external thread relative to another portion of the thread to lock the element against unscrewing rotation.

17. A tool for installing within a carrier part an element having an external thread centered about an axis and having a rotary drive portion forming an axially facing drive recess offset from said axis, said tool including a rotatable and axially movable tool body, rotary drive means carried by said body and including a drive lug offset from said axis and projecting axially into said recess and engageable with said rotary drive portion of the element to turn the latter about said axis and screw it into said carrier part, said body being displaceable axially relative to said element after said element is in said carrier part, and means forming a surface carried by the body at a location to engage said element and drive a portion of said external thread axially relative to another portion thereof upon said displacement of the surface to lock the element in the carrier part.

References Cited by the Examiner

UNITED STATES PATENTS

| | | | |
|---|---|---|---|
| 321,500 | 7/1885 | Howarth | 151—22 |
| 703,015 | 6/1902 | Swindell | 151—22 |
| 1,009,248 | 11/1911 | Jenkins et al. | 29—240 |
| 1,371,965 | 3/1921 | York. | |
| 2,044,924 | 6/1936 | Timken | 29—523 |
| 2,434,660 | 1/1948 | Knight | 29—240 XR |
| 3,003,378 | 10/1961 | Hotchner | 151—22 XR |

CHARLIE T. MOON, *Primary Examiner.*